US009935753B2

United States Patent
Kim et al.

(10) Patent No.: US 9,935,753 B2
(45) Date of Patent: Apr. 3, 2018

(54) METHOD AND DEVICE FOR RECEIVING SIGNAL BY REMOVING INTERFERENCE IN WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 15/038,392

(22) PCT Filed: Nov. 26, 2014

(86) PCT No.: PCT/KR2014/011410
§ 371 (c)(1),
(2) Date: May 20, 2016

(87) PCT Pub. No.: WO2015/080459
PCT Pub. Date: Jun. 4, 2015

(65) Prior Publication Data

US 2016/0294526 A1   Oct. 6, 2016

Related U.S. Application Data

(60) Provisional application No. 61/909,379, filed on Nov. 27, 2013.

(51) Int. Cl.
*H04L 5/00* (2006.01)
*H04J 11/00* (2006.01)
(Continued)

(52) U.S. Cl.
CPC ......... *H04L 5/0051* (2013.01); *H04B 7/0626* (2013.01); *H04J 11/0056* (2013.01);
(Continued)

(58) Field of Classification Search
CPC ... H04L 5/0023; H04L 5/0051; H04L 5/0073; H04W 72/042
See application file for complete search history.

(56) References Cited

U.S. PATENT DOCUMENTS

| | | | |
|---|---|---|---|
| 2014/0211731 A1* | 7/2014 | Inoue | H04B 7/0456 370/329 |
| 2016/0197690 A1* | 7/2016 | Li | H04L 25/0224 370/278 |
| 2016/0227525 A1* | 8/2016 | Werner | H04L 1/00 |

OTHER PUBLICATIONS

Ericsson et al., "Discussion on Potential Blind Detection/estimation of Parameters for NAICS," 3GPP TSG-RAN WG4 Meeting #68bis, R4-134651, Riga, Latvia, Aug. 7-11, 2013, 8 pages.
(Continued)

*Primary Examiner* — Asad Nawaz
*Assistant Examiner* — Saad A Waqas
(74) *Attorney, Agent, or Firm* — Birch, Stewart, Kolasch & Birch, LLP

(57) ABSTRACT

The present invention relates to a wireless communication system. A method by which a terminal receives a signal by removing interference in a wireless communication system, according to one embodiment of the present invention, comprises the steps of: detecting a demodulation reference signal (DMRS) from each of a plurality of resource blocks (RBs) included in a reception subframe; detecting an interference absence reference signal from the RB for which the detection of the DMRS has failed; receiving a signal on the basis of the assumption that the RBs from which an interference absence reference signal has been detected among the RBs for which the detection of the DMRS has failed have no interference from an interference base station, and RBs, from which the interference absence reference signal
(Continued)

has not been detected among the RBs for which the detection of the DMRS has failed, have interference from the interference base station.

12 Claims, 13 Drawing Sheets

(51) Int. Cl.
*H04B 7/06* (2006.01)
*H04W 72/04* (2009.01)
*H04B 7/0413* (2017.01)
*H04L 27/26* (2006.01)

(52) U.S. Cl.
CPC ......... *H04L 5/0073* (2013.01); *H04W 72/042* (2013.01); *H04B 7/0413* (2013.01); *H04L 5/0023* (2013.01); *H04L 27/261* (2013.01)

(56) References Cited

OTHER PUBLICATIONS

Ericsson, "On Signaling and Coordination Aspects of NAICS," 3GPP TSG RAN WG1#75, R1-135772, San Francisco, USA, Nov. 11-15, 2013, 3 pages.

Mediatek Inc., "On Network Signaling/coordination for NAICS and Possible Specification, Impact," 3GPP TSG-RAN WG1 #75, R1-135884, San Francisco, USA, Nov. 11-15, 2013, 6 pages.

Nsn et al., "On the NAICS System and Specification Impact," 3GPP TSG RAN WG1 Meeting #75, R1-135838, San Francisco, USA, Nov. 11-15, 2013, 5 pages.

ZTE, "Consideration on Network Signalling and Coordination for NAICS," 3GPP TSG RAN WG1 Meeting #75, R1-135380, San Francisco, USA, Nov. 11-15, 2013, pp. 1-4.

* cited by examiner

FIG. 5
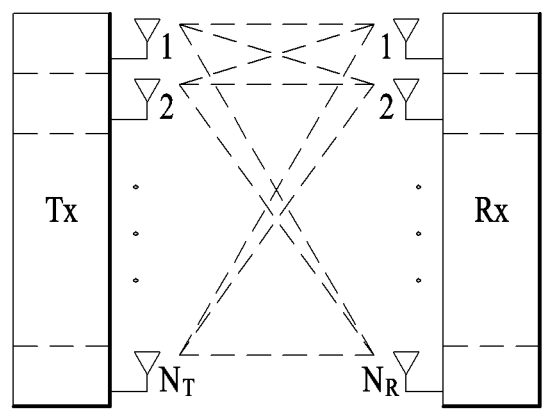
(a)
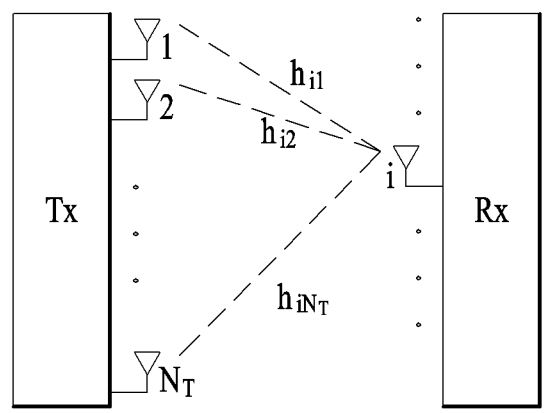
(b)

METHOD AND DEVICE FOR RECEIVING SIGNAL BY REMOVING INTERFERENCE IN WIRELESS COMMUNICATION SYSTEM

CROSS REFERENCE TO RELATED APPLICATIONS

This application is the National Phase of PCT International Application No. PCT/KR2014/011410, filed on Nov. 26, 2014, which claims priority under 35 U.S.C. 119(e) to U.S. Provisional Application No. 61/909,379, filed on Nov. 27, 2013, all of which are hereby expressly incorporated by reference into the present application.

TECHNICAL FIELD

The present invention relates to a wireless communication system, and more particularly, to a method and device for receiving a signal by removing interference in a wireless communication system.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE OF THE INVENTION

Technical Task

Based on the above discussion, a method and device for receiving a signal by removing interference in a wireless communication system are proposed in the present invention.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of receiving a signal, which is received by eliminating interference by a user equipment in a wireless communication system, including the steps of detecting a demodulation reference signal (DMRS) from each of a plurality of resource blocks (RBs) included in a reception subframe, detecting an interference absence reference signal from each of RBs where the user equipment fails to detect the DMRS, and receiving the signal based on an assumption that among the RBs where the user equipment fails to detect the DMRS, an RB from which the interference absence reference signal is detected has no interference from an interfering base station and an RB from which the interference absence reference signal is not detected has interference from the interfering base station.

In a $2^{nd}$ technical aspect of the present invention, provided herein is a user equipment for receiving a signal by eliminating interference in a wireless communication system, including a radio frequency (RF) unit and a processor, wherein the processor may be configured to detect a demodulation reference signal (DMRS) from each of a plurality of resource blocks (RBs) included in a reception subframe, detect an interference absence reference signal from each of RBs where the DMRS detection is failed, and receive the signal based on an assumption that among the RBs where the DMRS detection is failed, an RB from which the interference absence reference signal is detected has no interference from an interfering base station and an RB from which the interference absence reference signal is not detected has interference from the interfering base station.

The following matters may be included in the $1^{st}$ and $2^{nd}$ technical aspects of the present invention.

The RB from which the interference absence reference signal is detected among the RBs where the user equipment fails to detect the DMRS may be assumed to be an RB on which the interfering base station performs muting.

The RB from which the interference absence reference signal is not detected among the RBs where the user equipment fails to detect the DMRS may be assumed to be an RB on which the interfering base station performs CRS (common reference signal) based PDSCH (physical downlink control channel) transmission.

The interference absence reference signal may be transmitted less frequently than a reference signal for channel estimation.

The interference absence reference signal may be generated using a PN (pseudo noise) code based on a cell identifier.

2-port CSI-RS (channel state information reference signal) may used for the interference absence reference signal.

The interference absence reference signal may be transmitted per reference subframe period.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a schematic diagram illustrating a wireless communication system having multiple antennas;

BEST MODE FOR INVENTION

Figure 1:
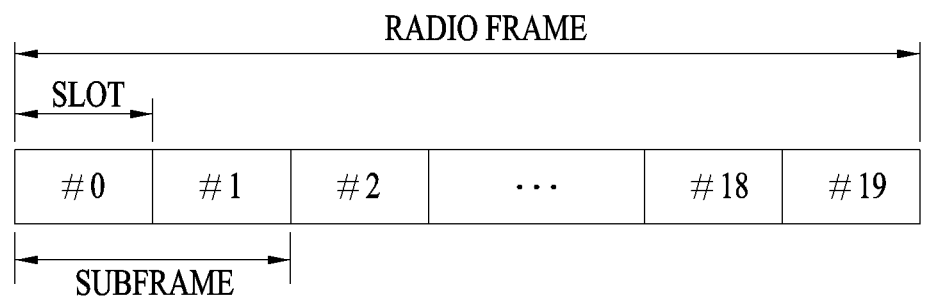
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
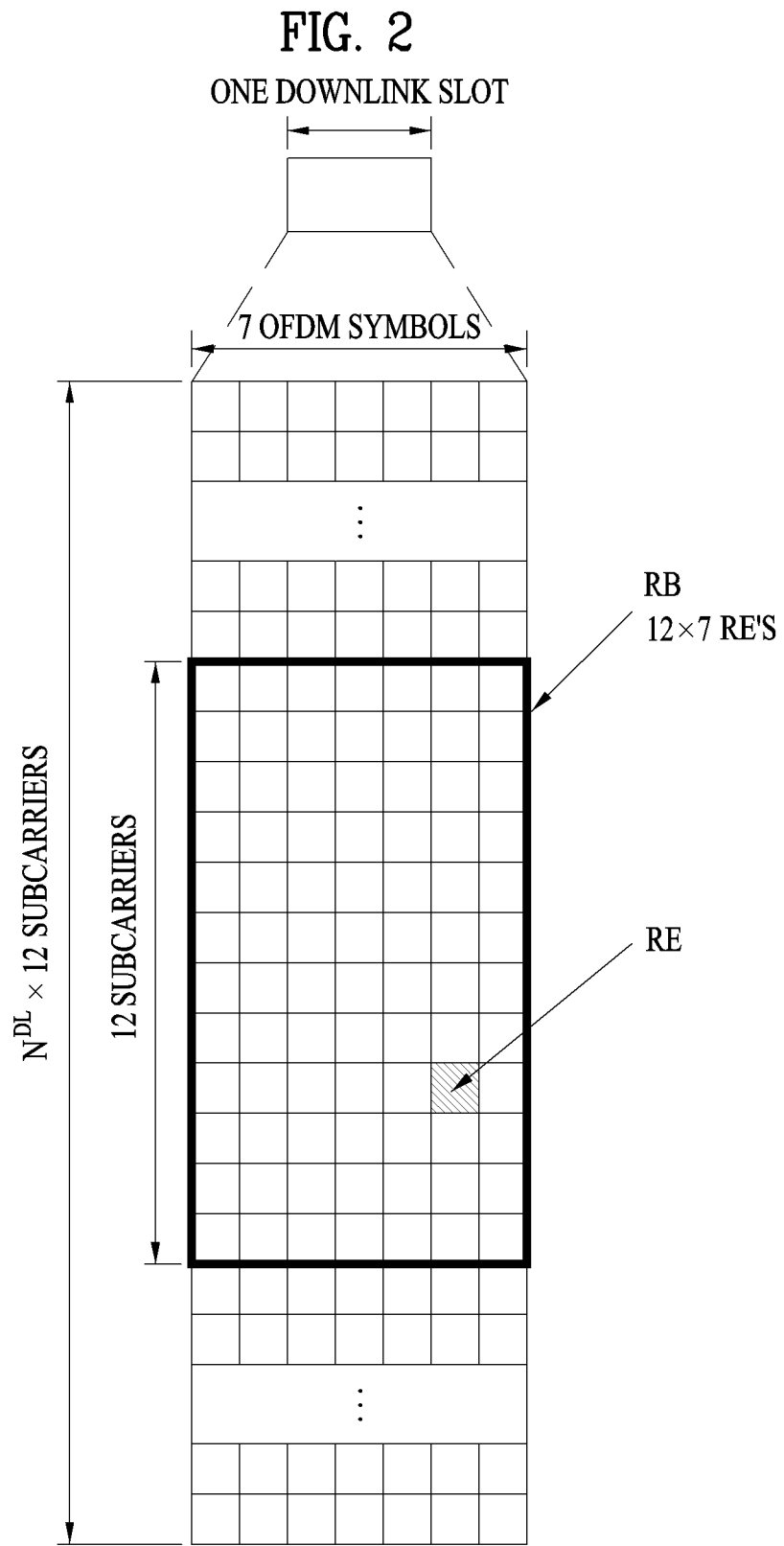
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,1) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
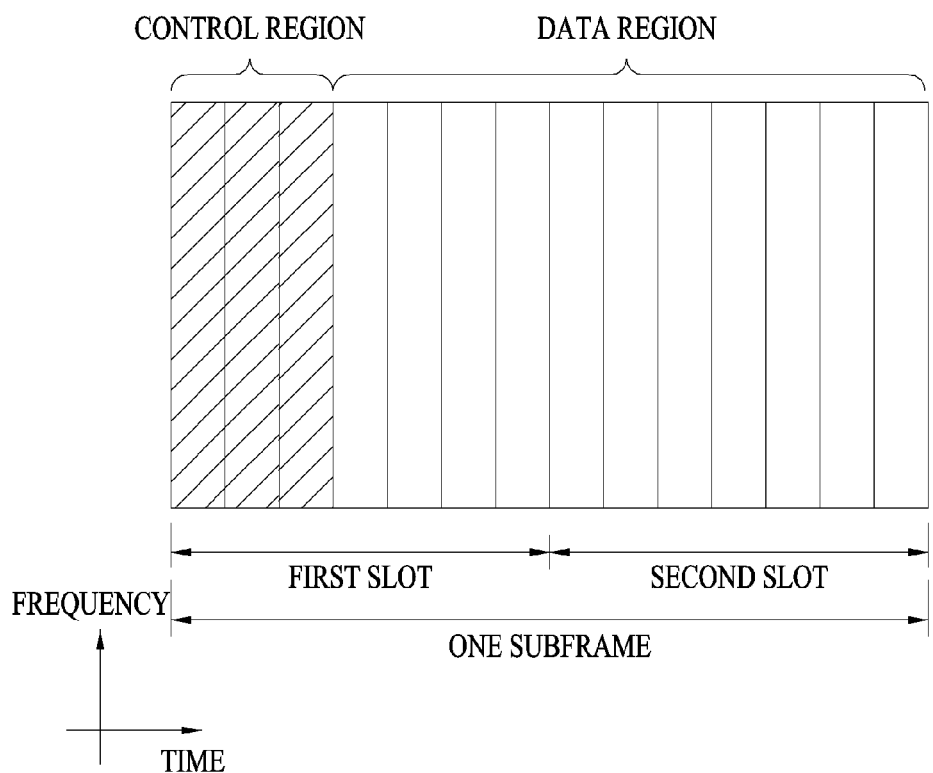
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
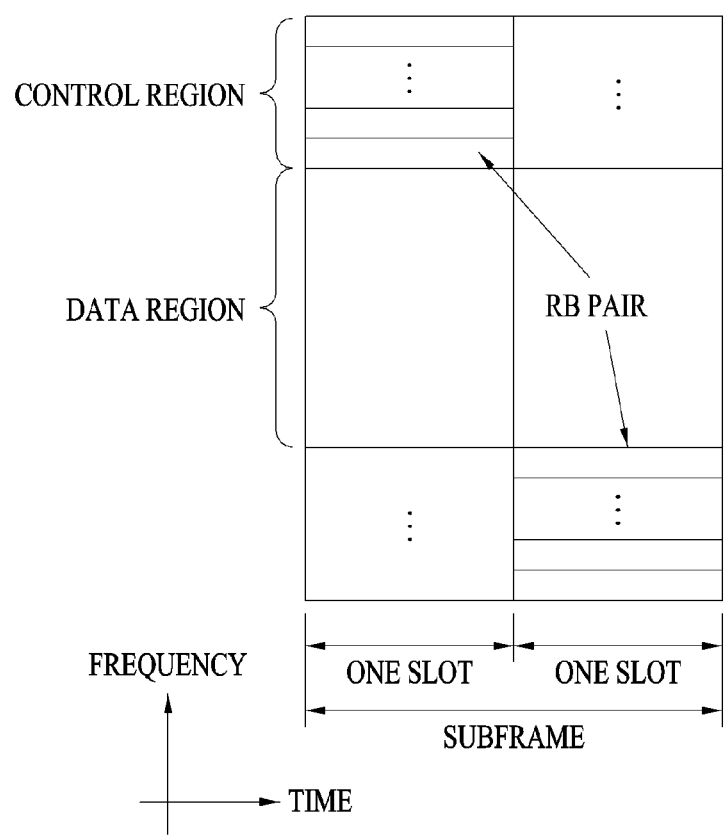
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$= W\hat{s} = WPs$$

Here, $w_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y=[y_1, y_2, \ldots, y_{N_R}]^T \quad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T=[h_{i1}, h_{i2}, \ldots, h_{iN_T}] \quad \text{[Equation 7]}$$

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel which has passed the channel matrix. The AWGN (n1, n2, . . . , nNR) added to each of NR reception (Rx) antennas can be represented by Equation 9 below.

$$n=[n_1, n_2, \ldots, n_{N_R}]^T \quad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \quad \text{[Equation 10]}$$

$$= Hx + n$$

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \le \min(N_T, N_R) \quad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
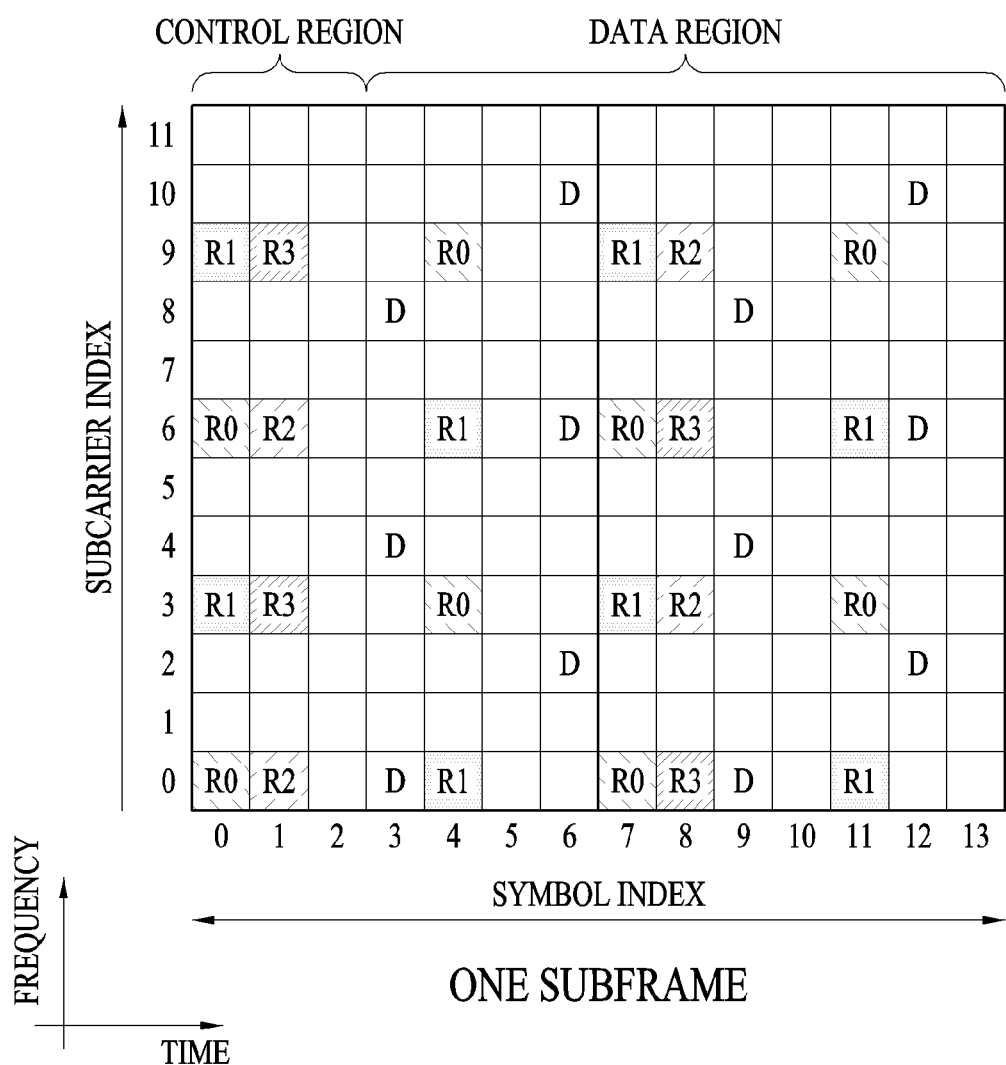
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
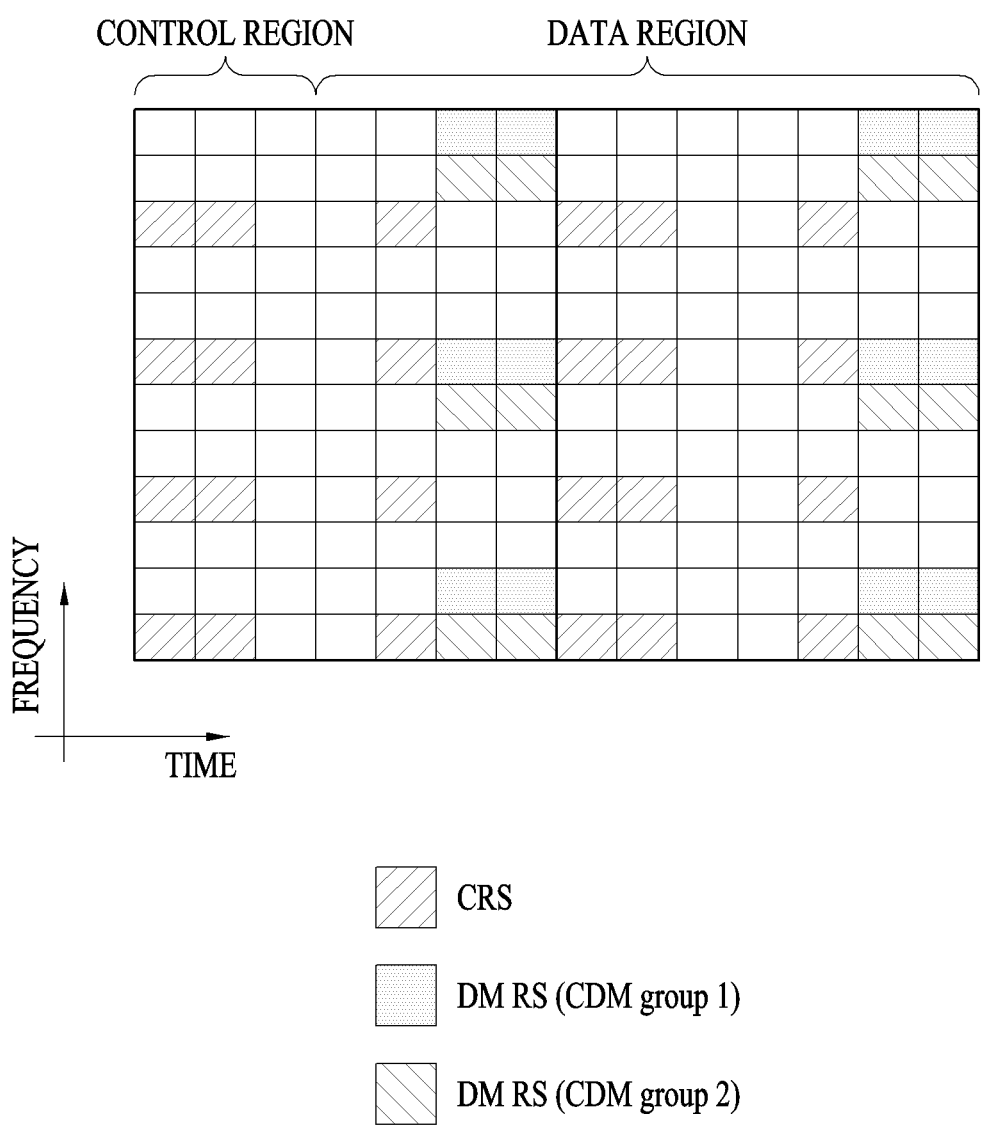
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
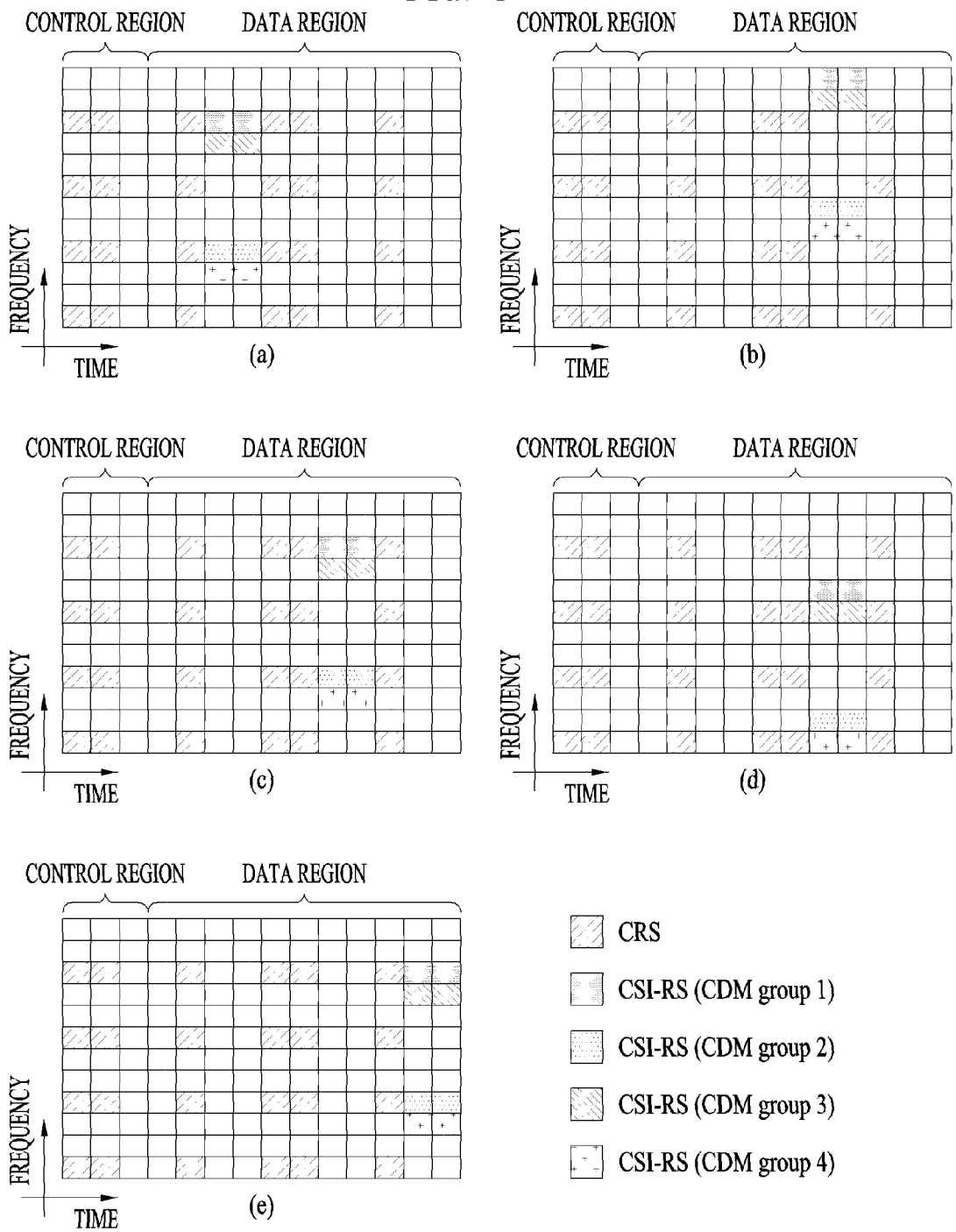
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(*a*) to 8(*e*) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(*a*), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(*a*) is applicable to the CSI-RS patterns illustrated in FIGS. 8(*b*) to 8(*e*).

However, the above RS patterns described with reference to FIGS. 6 to 8 are merely examples and the present invention is not limited to a specific RS pattern when its various embodiments are applied. That is, the various embodiments of the present invention may be equally applied even when different RS patterns from those of FIGS. 6 to 8 are defined and used.

CSI-RS Configuration

One CSI process may be defined in a manner of associating one CSI-RS resource for signal measurement with one IMR (interference measurement resource) for interference measurement among a plurality of CSI-RS and IMR, which are configured for a user equipment. The user equipment provides feedback with respect to each CSI, which is derived from each different CSI process, using an independent period and subframe offset.

In other words, each CSI process has independent CSI feedback configuration. A base station may inform a user equipment of information on the association of the CSI-RS resource and the IMR resource, CSI feedback configuration, etc. per CSI process through high layer signaling such as RRC. For example, it is assumed that three CSI processes are configured for a user equipment as shown in Table 1.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 represent CSI-RS received from cell 1 corresponding to a serving cell of the user equipment and CSI-RS received from cell 2 corresponding to a neighboring cell participating in cooperation, respectively. It is assumed that IMR configured for each CSI process of Table 1 is configured as illustrated in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

In IMR 0, the cell 1 performs muting, the cell 2 performs data transmission, and the user equipment is configured to measure interference from different cells except the cell 1 from the IMR 0. Likewise, in IMR 1, the cell 2 performs muting, the cell 1 performs data transmission, and the user equipment is configured to measure interference from different cells except the cell 2 from the IMR 1. Also, in IMR 2, both of the cell 1 and the cell 2 perform muting and the user equipment is configured to measure interference from different cells except both of the cell 1 and the cell 2 from the IMR 2.

Therefore, as shown in Table 1 and Table 2, CSI of CSI process 0 represents optimized RI, PMI and CQI information when data is received from the cell 1. CSI of CSI process 1 represents optimized RI, PMI and CQI information when data is received from the cell 2. CSI of CSI process 2 represents optimized RI, PMI and CQI information when data is received from the cell 1 and that there is no interference from the cell 2.

In case of a plurality of CSI processes configured for a single user equipment, it is preferred that dependent values are shared between the CSI processes. For instance, in case of joint transmission (JT) of the cell 1 and the cell 2, if the CSI process 1, in which a channel of the cell 1 is considered as a signal part, and the CSI process 2, in which a channel of the cell 2 is considered as a signal part, are configured for the single user equipment, ranks of the CSI process 1 and the CSI process 2 need to be equal to a selected subband index in order to easily perform JT scheduling.

A base station may configure a transmission period or transmission pattern of the CSI-RS. In order to perform measurement based on the CSI-RS, a user equipment should know CSI-RS configuration for each CSI-RS antenna port of a cell to which the user equipment belongs. The CSI-RS configuration may include an index of a downlink subframe in which the CSI-RS is transmitted, a time-frequency location (for example, CSI-RS patterns as shown in FIG. 8(*a*) to FIG. 8(*e*)) of a CSI-RS resource element (RE) within a transmission subframe, and a CSI-RS sequence (used for CSI-RS and generated pseudo-randomly in accordance with a predetermined rule on the basis of slot number, cell ID, CP length, etc.). In other words, a plurality of CSI-RS configurations may be used by a given base station and the base station indicate a specific CSI-RS configuration, which will be used for user equipment(s) in a cell, among the plurality of the CSI-RS configurations.

In addition, since CSI-RSs for individual antenna ports needs to be identified from one another, resources used for transmitting the CSI-RSs for the individual antenna ports should be orthogonal to one another. As described with reference to FIG. 8, the CSI-RSs for the individual antenna ports may be multiplexed according to FDM, TDM and/or CDM scheme by using orthogonal frequency resources, orthogonal time resources and/or orthogonal code resources.

When the base station notifies the user equipments in the cell of CSI-RS information (CSI-RS configuration), the base station should first notify the user equipment of information on time-frequency resources to which the CSI-RSs for the respective antenna ports are mapped. In detail, the time information may include subframe numbers in which the CSI-RSs are transmitted, transmission periods of the CSI-RSs, offsets of subframe in which the CSI-RSs are transmitted, and an OFDM symbol number in which a CSI-RS resource element (RE) for a specific antenna is transmitted, and the like. The frequency information may include frequency spacing in which a CSI-RS resource element (RE) for a specific antenna is transmitted, offset or shift value of RE on a frequency axis, and the like.

Figure 9:
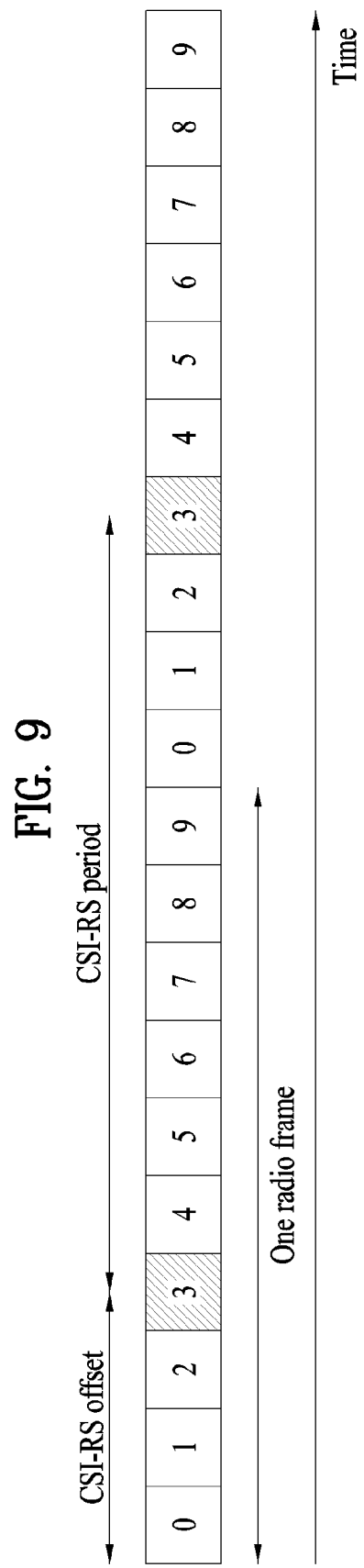
FIG. 9 is a diagram for describing an example of a scheme for transmitting CSI-RS periodically.

FIG. 9 is a diagram for describing an example of a scheme for transmitting CSI-RS periodically. The CSI-RS may be transmitted with a period of integer multiple of one subframe (for example, 5-subframe period, 10-subframe period, 20-subframe period, 40-subframe period, or 80-subframe period).

Referring to FIG. 9, one radio frame includes 10 subframes (subframe numbers 0 to 9). For example, in FIG. 9, a base station transmits the CSI-RS with a period of 10 ms and CSI-RS transmission offset is set to 3. Individual base station may have different CSI-RS offset values such that CSI-RSs in a plurality of cells are uniformly distributed on the time domain. If the CSI-RS is transmitted with a period of 10 ms, the offset value may have one of 0 to 9. Similarly, if the CSI-RS is transmitted with a period of 5 ms, the offset value may have one of 0 to 4. If the CSI-RS is transmitted with a period of 20 ms, the offset value may have one of 0 to 19. If the CSI-RS is transmitted with a period of 40 ms, the offset value may have one of 0 to 39. If the CSI-RS is transmitted with a period of 80 ms, the offset value may have one of 0 to 79. This offset value represents a value of a subframe from which the base station starts CSI-RS transmission with a predetermined period. If the base station informs the user equipment of the transmission period and offset value of the CSI-RS, the user equipment may receive the CSI-RS from the base station in corresponding subframes using the corresponding values. The user equipment may measure a channel through the received CSI-RS and, as a result, report information such as CQI, PMI and/or RI (Rank Indicator) to the base station. In this specification, CQI, PMI, and RI may be referred to as CQI (or CSI) except that they are described separately. Also, the CSI-RS transmission period and offset may be designated separately for each CSI-RS configuration.

Figure 10:
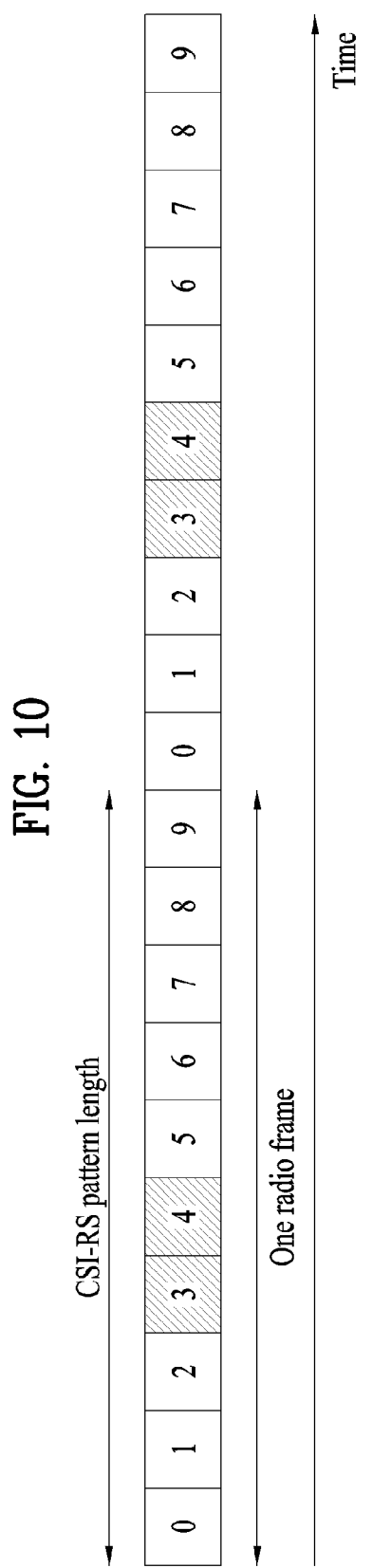
FIG. 10 is a diagram for describing an example of a scheme for transmitting CSI-RS aperiodically.

FIG. 10 is a diagram for describing an example of a scheme for transmitting CSI-RS aperiodically. Referring to FIG. 10, one radio frame includes 10 subframes (subframe numbers 0 to 9). As shown in FIG. 10, there may be a specific pattern of subframes in which the CSI-RS is transmitted. For instance, a CSI-RS transmission pattern may be configured with 10 subframes. And, in each subframe, whether the CSI-RS is transmitted may be indicated by a 1-bit indicator. FIG. 10 illustrates a CSI-RS pattern in which the CSI-RS is transmitted in subframes having indices 3 and 4 among 10 subframes (subframe indices 0 to 9). In addition, such an indicator can be provided with a user equipment through higher layer signaling.

As described above, the configurations for the CSI-RS transmission can be implemented in various manners. Moreover, in order for the user equipment to perform accurate channel measurement by receiving the CSI-RS correctly, the base station should inform the corresponding user equipment of the CSI-RS configuration. Hereinafter, the embodiments of the present invention, which relate to a scheme for informing a user equipment of CSI-RS configuration, are described in detail.

Scheme for Informing CSI-RS Configuration

In general, a scheme for a base station to inform a user equipment of a CSI-RS configuration can be classified into two schemes in the following description.

As a first scheme, the base station can broadcast information on the CSI-RS configuration to user equipments through dynamic broadcast channel (DBCH) signaling.

When the base station informs the user equipments of system information in the legacy LTE system, the base station generally transmits the information to the user equipments though BCH (broadcasting channel). If the base station is unable to transmit the system information through the BCH only since the system information has too many contents, the base station may transmit the system information in a manner of masking PDCCH CRC of corresponding data using not a specific user equipment identifier (e.g., C-RNTI) but a system information identifier (SI-RNTI) while the base station transmits the system information according to the same scheme as that used for transmitting general DL data. In this case, actual system information is transmitted in a PDSCH region similar to general unicast data. Thus, after decoding PDCCH using the SI-RNTI, all user equipments in a cell may obtain the system information by decoding PDSCH indicated by the PDCCH. The aforementioned broadcasting scheme may be referred to as a DBCH (dynamic BCH) scheme to distinguish it from a PBCH (physical BCH) scheme corresponding to a general broadcasting scheme.

Meanwhile, system information broadcasted in the legacy LTE system can be mainly divided into two types. One is MIB (master information block) transmitted through PBCH and the other is SIB (system information block) transmitted in a PDSCH region in a manner of being multiplexed with general unicast data. Since information transmitted according to SIB type 1 to SIB type 8 (SIB1 to SIB8) is defined in the legacy LTE system, a new SIB type can be defined for information on the CSI-RS configuration, which corresponds to new system information not defined in legacy SIB types. For instance, after defining SIB9 or SIB10, the base station can inform the user equipments in the cell of the information on the CSI-RS configuration according to the DBCH scheme.

As a second scheme, the base station can inform each user equipment of the information on the CSI-RS configuration using RRC (radio resource control) signaling. That is, the information on the CSI-RS configuration can be provided to each user equipment in the cell through dedicated RRC signaling. For instance, while a user equipment establishes a connection with the base station through an initial access procedure or a handover procedure, the base station can inform the user equipment of the CSI-RS configuration through the RRC signaling. Alternatively, when the base station transmits an RRC signaling message for requesting channel state feedback on the basis of CSI-RS measurement, the base station can inform the corresponding user equipment of the CSI-RS configuration through the corresponding RRC signaling message.

Indication of CSI-RS Configuration

A random base station may use a plurality of CSI-RS configurations and the base station may transmit CSI-RS according to each of a plurality of CSI-RS configurations to a user equipment in a predetermined subframe. In this case, the base station may inform the user equipment of a plurality of the CSI-RS configurations. In addition, the base station may inform the user equipment which CSI-RS is to be used for performing channel state measurement for CQI (channel quality information) or CSI (channel state information) feedback among the CSI-RS configurations.

Hereinafter, embodiments for a base station to indicate a CSI-RS configuration to be used in a user equipment and CSI-RS for the user equipment to perform channel measurement are described.

Figure 11:
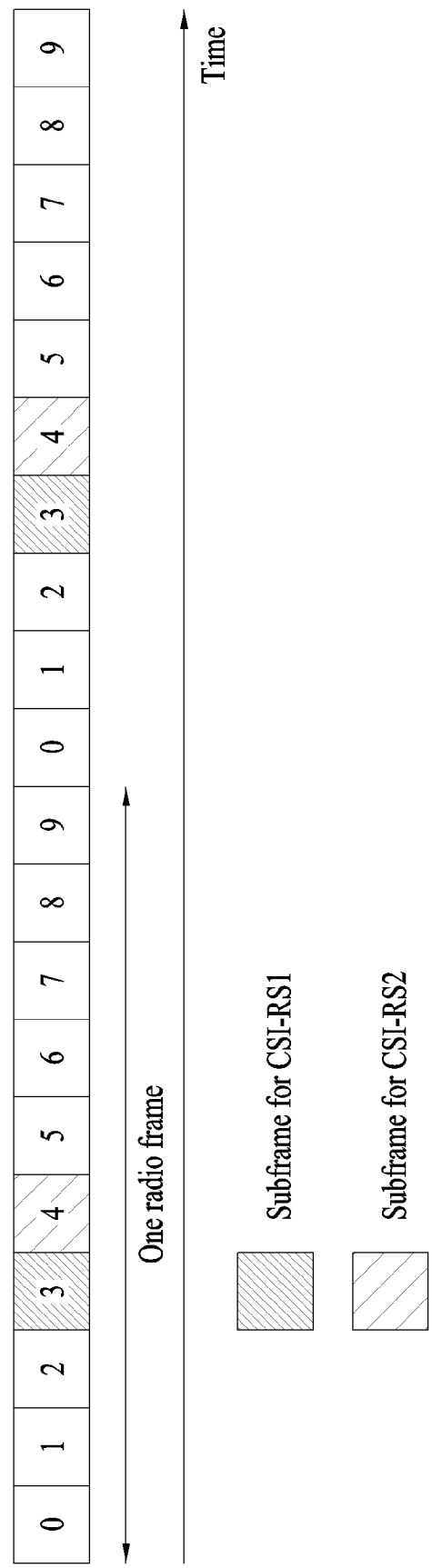
FIG. 11 is a diagram for describing an example of using two CSI-RS configurations.

FIG. 11 is a diagram for describing an example of using two CSI-RS configurations. FIG. 11 shows that one radio frame includes 10 subframes (subframe numbers 0 to 9). Referring to FIG. 11, a first CSI-RS configuration, i.e., CSI-RS 1 has a CSI-RS transmission period of 10 ms and a CSI-RS transmission offset of 3. And, a second CSI-RS configuration, i.e., CSI-RS 2 has a CSI-RS transmission period of 20 ms and a CSI-RS transmission offset of 4. The base station informs the user equipment of information on the two CSI-RS configurations and may also inform the user equipment which one of the two CSI-RS configurations is to be used for CQI (or CSI) feedback.

If CQI feedback with respect to a specific CSI-RS configuration is requested from the base station, the user equipment can perform channel state measurement using only CSI-RSs belonging to the corresponding CSI-RS configuration. In detail, a channel state is determined by CSI-RS reception quality and a function of the amount of noise/interference and a correlation coefficient. Measurement of the CSI-RS reception quality is performed using only the CSI-RS belonging to the corresponding CSI-RS configuration. In order to measure the noise/interference amount and the correlation coefficient (e.g., interference covariance matrix indicating a direction of interference), measurement can be performed based on subframes in which the corresponding CSI-RS is transmitted or designated subframes. For instance, in the embodiment of FIG. 11, when the base station requests the user equipment to provide feedback with respect to the first CSI-RS configuration (CSI-RS1), the user equipment measures reception quality measurement based on CSI-RS transmitted in a fourth subframe (subframe index 3) of one radio frame. In order for the user equipment to measure the noise/interference amount and the correlation coefficient, the base station may designate odd-number subframes for the user equipment separately. Alternatively, the base station can designate one specific limited subframe (e.g., subframe index 3) for the user equipment to measure the CSI-RS reception quality, the noise/interference amount, and the correlation coefficient For instance, reception signal quality measured based on CSI-RS can be simply represented as 'S/(I+N)' as SINR (signal-to-interference plus noise ratio) (where, 'S' is strength of a reception signal, 'I' is the amount of interference, and 'N' is the amount of noise). The 'S' can be measured through CSI-RS in a subframe including the CSI-RS in a subframe including a signal transmitted to the corresponding user equipment. Since the 'I' and 'N' vary according to the amount of interference from a neighboring cell, a direction of a signal transmitted from the neighboring cell, the 'I' and 'N' can be measured in the subframe in which the 'S' is measured or through CRS transmitted in a separately designated subframe.

In this case, the measurement of the amount of noise/interference and correlation coefficient can be performed through CRS of a corresponding subframe or a resource element (RE) in which the CSI-RS is transmitted. Alternatively, the measurement may be performed though a null resource element (null RE), which is configured to facilitate noise/interference measurement. In order to perform the noise/interference measurement through the CRS or the CSI-RS RE, the user equipment first recovers the CRS or the CSI-RS and then subtracts a result of the recovery from a reception signal to set aside noise and interference signals. Thus, the user equipment can obtain statistic of the noise/interference. The Null RE means an RE left empty (i.e., transmit power is 0 (zero)) by a corresponding base station without transmitting any signal. The Null RE makes easy to measure a signal from a different base station except the corresponding base station. Although all of the CRS RE, the CSI-RS RE, and the Null RE can be used to measure the noise/interference amount and the correlation coefficient, the base station can designate which of the REs is used to measure the noise/interference among the CRS RE, the CSI-RS RE, and the Null RE for the user equipment. This is because it is necessary to properly designate RE to be measured by the user equipment according to whether a signal of a neighboring cell, which is transmitted in a location of the RE where the user equipment performs measurement, corresponds to a data signal or a control signal. Since the signal of the neighboring cell transmitted in the location of the RE varies according to whether an inter-cell synchronization is matched, the CRS configuration, the CSI-RS configuration, or the like, the base station needs to designate the RE in which the user equipment should perform the measurement in a manner of identifying a type of the signal. In other words, the base station can instruct the user equipment to measure the noise/interference using a part or all of the CRS RE, the CSI-RS RE, and the Null RE.

For instance, the base station can use a plurality of CSI-RS configurations. When informing the user equipment of one or more CSI-RS configurations, the base station can inform the user equipment of a CSI-RS configuration to be used for CQI feedback and a location of the Null RE. The CSI-RS configuration to be used for the CQI feedback in the user equipment may correspond to a CSI-RS configuration transmitted with non-zero transmit power, which is different from the Null RE transmitted with zero transmit power. For instance, when the base station informs the user equipment of one CSI-RS configuration necessary for the user equipment to perform channel measurement, the user equipment may assume that CSI-RS is transmitted with non-zero transmit power in the case of the one CSI-RS configuration. In addition, when the base station informs the user equipment of a CSI-RS configuration transmitted with zero transmit power (i.e., a location of the Null RE), the user equipment may assume that transmit power in a location of the resource element (RE) in the corresponding CSI-RS configuration is zero. In other word, when informing the user equipment of one CSI-RS configuration corresponding to non-zero transmit power, the base station can inform the user equipment of the location of the corresponding Null RE if there is a CSI-RS configuration corresponding to zero transmit power.

As a modified example of the aforementioned CSI-RS configuration indication scheme, after informing the user equipment of a plurality of CSI-RS configurations, the base station may inform the user equipment of a part or all of a plurality of the CSI-RS configurations to be used for CQI feedback. Thus, after receiving a request for the CQI feedback with respect of the plurality of the CSI-RS configurations, the user equipment may measure CQI using CSI-RS corresponding to each CSI-RS configuration and then transmit a plurality of measured CQI informations to the base station together.

Alternatively, in order for the user equipment to transmit CQI for each of the plurality of the CSI-RS configurations to the base station, the base station can previously designate an uplink resource, which is necessary for the user equipment to transmit the CQI, in each of the plurality of the CSI-RS configurations. And, information on designation of the above uplink resource can be provided to the user equipment in advance through RRC signaling.

Alternatively, the base station can dynamically trigger the user equipment to transmit CQI for each of the plurality of the CSI-RS configurations to the base station. The dynamic triggering for the CQI transmission can be performed based on PDCCH. Through the PDCCH, the base station can inform the user equipment which CSI-RS configuration is used by the user equipment for performing CQI measurement. After receiving the PDCCH, the user equipment can feedback a CQI measurement result with respect to the CSI-RS configuration, which is designated through the corresponding PDCCH, to the base station.

A transmission time of CSI-RS corresponding to each of the plurality of the CSI-RS configurations can be designated to be transmitted in a different subframe or an identical subframe. If CSI-RSs based on different CSI-RS configurations are designated to be transmitted in the same subframe, it is necessary to distinguish the CSI-RSs from one another. In order to distinguish the CSI-RSs according to the different CSI-RS configurations from one another, at least one of a time resource, a frequency resource and a code resource of the CSI-RS transmission can be differently applied. For instance, in a corresponding subframe, a location of RE in which the CSI-RS is transmitted can be differently designated per CSI-RS configuration (for example, CSI-RS according to a CSI-RS configuration is transmitted in an RE location of FIG. 8(*a*) and CSI-RS according to a different CSI-RS configuration is transmitted in an RE location of FIG. 8(*b*) in the same subframe). Alternatively, when the CSI-RSs according to the different CSI-RS configurations are transmitted in the same RE location, the CSI-RSs can be distinguished from each other by differently using a CSI-RS scrambling code in the different CSI-RS configurations (i.e., distinction based on a code resource).

Quasi Co-located (QC)

A user equipment may receive data from a plurality of transmission points (TPs), for example, TP1 and TP2 and thus may transmit channel state information on the plurality of the TPs. In this case, RSs may be transmitted to the user equipment from the plurality of the TPs. If characteristics for channel estimation with respect to different RS ports of the different TPs can be shared, reception processing load and complexity of the user equipment may be reduced. In addition, if characteristics for channel estimation with respect to different RS ports of the same TP can be shared by the RS ports, the reception processing load and complexity of the user equipment may be decreased. Thus, in the LTE-A system, a method for sharing characteristics for channel estimation between RS ports has been proposed.

For the channel estimation between the RS ports, the concept of "quasi co-located (QCL)" has been introduced in the LTE-A system. For example, if a large-scale property of a radio channel used for transmitting a symbol through one antenna port can be inferred from a radio channel used for transmitting a symbol through a different antenna port, then the two antenna ports can be considered to be quasi-co-located. In this case, the large-scale property includes at least one of delay spread, Doppler spread, Doppler shift, average gain and average delay. In the following description, the term "quasi-co-located" will be referred to as QCL.

That is, when two antenna ports are QCL, it means that the large-scale property of a radio channel from one antenna port is identical to the large-scale property of a radio channel from the other antenna port. If antenna ports through which different types of RSs are transmitted are QCL, the large-scale property of a radio channel from one antenna port may be replaced with the large-scale property of a radio channel from the other antenna port.

According to the concept of quasi-co-location (QCL), in case of non-QCL antenna ports, a user equipment is unable to assume the same large-scale property for radio channels from the corresponding non-QCL antenna ports. In this case, for each of the non-QCL antenna ports, the user equipment should perform independent processing for timing acquisition and tracking, frequency offset estimation and compensation, delay estimation and Doppler estimation, etc.

In the case of antenna ports for which QCL can be assumed, it is advantageous in that the user equipment performs the following operations. First of all, the user equipment may use delay spread, Doppler spectrum and Doppler spread estimation result with respect to a radio channel from one antenna port in case of channel estimation with respect to a radio channel from the other antenna port. Secondly, with regard to frequency shift and received timing, the user equipment may perform time and frequency synchronization for one antenna port and then apply the same synchronization to demodulation with respect to the other antenna port. Finally, for average reception power, the user equipment may average RSRP (reference signal received power) measurement with respect to two or more antenna ports.

If receiving a DMRS-based DL-related DCI format through a control channel (PDCCH or ePDCCH), the user equipment performs channel estimation with respect to a corresponding PDSCH through a DMRS sequence and then performs data demodulation. For example, if the user equipment can assume QCL between a configuration of DMRS ports received through a downlink scheduling grant and CRS ports, then the user equipment may apply an estimation value of the large-scale property of a radio channel, which has been estimated from the CRS ports, to channel estimation through the corresponding DMRS ports without any change. The reason for this is that the estimation value of the large-scale property can be obtained from CRS more stably since the CRS is a reference signal that is broadcasted with relatively high density in each subframe across the full band. On the contrary, DMRS is transmitted for a specific scheduled RB UE-specifically. In addition, since a precoding matrix used by a base station for transmission may be changed per PRG, a valid channel received by the user equipment may be changed per PRG. Accordingly, if the DMRS is used to estimate the large-scale property of a radio channel across a wide band. In case of CSI-RS, since the CSI-RS has a long transmission period and low transmission density, performance degradation may occur if the CSI-RS is used to estimate the large-scale property of the radio channel.

That is, QCL assumption between antenna ports may be used for reception of various downlink reference signals, channel estimation, channel state reporting, etc.

Interference Elimination Method

Figure 12:
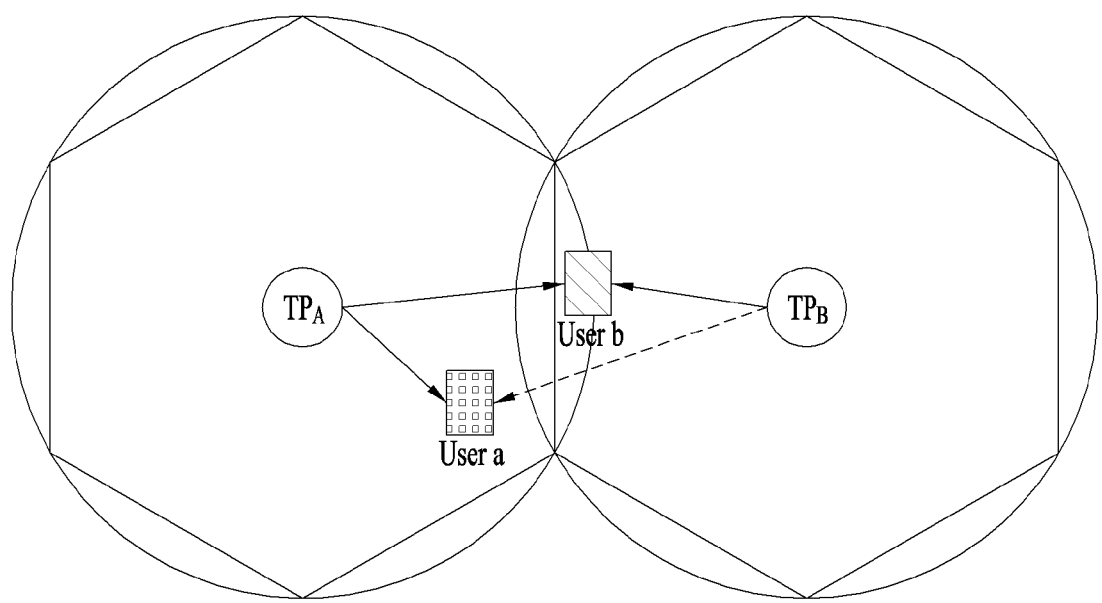
FIG. 12 illustrates a general interference environment of a downlink system.

FIG. 12 illustrates a general interference environment of a downlink system.

In FIG. 12, a cell managed by TP A is referred to as cell A and a user equipment communicating with the TP A is referred to as UE A. Similarly, cell B and UE B exist in adjacent TP B. Since the same radio resources are used in the cell A and cell B, the UE B, which is located at a cell boundary, receives interference from the cell A. Hereinafter, the cell A, the TP A, the cell B, the TP B, and the UE B are referred to as an interfering cell, an interfering TP, a serving cell, a serving TP, and a NAICS UE, respectively. The NAICS UE can improve a data receiving rate by eliminating an interference signal transmitted from the interfering cell.

To eliminate the interference efficiently, the NAICS UE needs to know a variety of information (e.g., interference parameter (IP)) with respect to the interference signal. For instance, information such as CFI, MBSFN configuration, RI, CRS AP, Cell ID, Modulation Order, MCS, RNTI, or TM is required in a NAICS environment, which is independent from TM (transmission mode). In a CRS TM based NAICS environment, information such as PMI, Data to RS EPRE, PA, PB, System bandwidth, or PDSCH allocation is required. In a DM-RS TM based NAIC environment, information such as PDSCH bandwidth for DM-RS, Data to RS EPRE, PB, DMRS APs, nSCID, CSI-RS presence and their pattern, or Virtual cell ID is required.

If there is interference from the cell A, the UE B performs NAICS on its PDSCH reception resources. Otherwise, the UE B performs data demodulation in the same manner as the previous one. In other words, the UE B needs to first check whether it is affected by the interference from the cell A. However, depending on TM of the cell A, schemes for obtaining such information (the presence or non-presence of the interference) may be changed.

For instance, if the cell A, which is the interfering cell, operates in TM 9/10, the UE B may confirm the presence of the interference by detecting DMRS of the cell A. In other words, after generating a DMRS sequence of the cell A, the UE B correlates the generated DMRS sequence and a signal received in DMRS RE. If the correlated result has a large value, the UE B assumes that it is affected by the interference from the cell A. On the contrary, if the correlated result has a small value, the UE B assumes that there is no interference from the cell A. In the case of the TM 9/10, since the presence of DMRS is determined according to the presence of data, the presence of the interference can be confirmed through the DMRS detection as described above.

However, if the cell A performs data transmission according to TM 4, CRS exists at all times irrespective of the presence or non-presence of data. Thus, it may cause a problem that the presence of the interference cannot be confirmed through CRS detection.

To solve the above problem, the present invention defines new RS for informing the UE B of the presence or non-presence of the interference.

Figure 13:
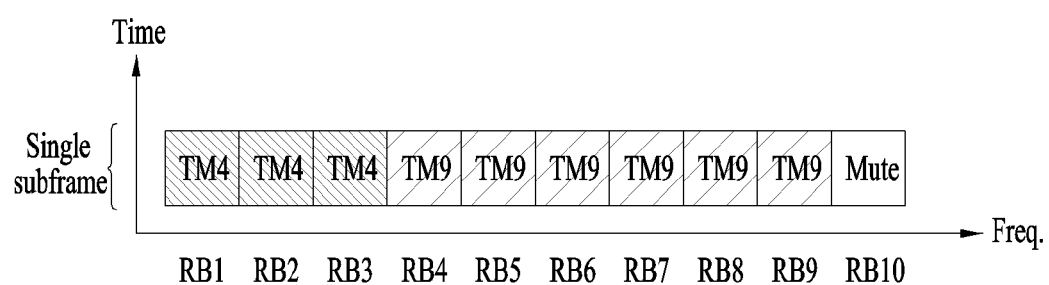
FIG. 13 illustrates an example of scheduling in a subframe using 10 RBs of bandwidth.

FIG. 13 illustrates an example that the cell A performs scheduling on a random subframe by utilizing 10 RBs as DL bandwidth.

Referring to FIG. 13, the cell A transmits data in RBs 4, 5, 6, 7, 8 and 9 according to TM 9, transmits data in RBs 1, 2 and 3 according to TM 4, and does not transmit data in RB 10 since there is no data to be transmitted.

Since the UE B does not have scheduling information of the cell A, the UE B first performs the DMRS detection using the DMRS of the cell A. In the RBs 4, 5, 6, 7, 8 and 9, the UE B succeeds in the DMRS detection since the cell A transmits the data in the corresponding RBs according to TM 9. Accordingly, the UE B can be aware of the fact that interference exists in each of the RBs and the corresponding interference is transmitted according to TM 9.

However, since the UE B fails in the DMRS detection in the remaining RBs, i.e., RBs 1, 2, 3 and 10, the UE B is unable to know whether the cell A performs CRS based PDSCH transmission or muting in the corresponding RBs. In order for the UE B to be aware of the current operation of the cell A, two embodiments according to the present invention are described in the following.

First Embodiment

The first embodiment of the present invention relates to a method for transmitting an interference absence reference signal (IARS) in muting RB of an interfering cell.

The cell A transmits the IARS in the muting RB. If detecting IARS successfully, the UE B assumes that the cell A has performed muting on the corresponding RB. On the other hand, if the UE B fails to detect both of the DMRS and the IARS, the UE B assumes that the cell A has performed CRS based PDSCH transmission in the corresponding RB.

In FIG. 13, for instance, the cell A transmits the IARS only in the RB 10. And, the UE B performs the IARS detection on RBs where the DMRS detection is failed, i.e., RBs 1, 2, 3 and 10. After successfully detecting the IARS from the RB 10, the UE may know that there is no interference from the cell A in the RB 10. Thereafter, the UE performs NAICS on the remaining RBs 1, 2 and 3 based on the assumption that the cell A performs CRS based transmission in the RBs 1, 2 and 3.

Since the purpose of the IARS is not to estimate a channel but to detect whether an adjacent cell is in muting based on energy detection received through the IARS, it may have sufficiently low density compared to CRS, CSI-RS, and DMRS, which are used for channel estimation.

An IARS sequence may be generated from a PN code of which the seed is a cell ID and all information necessary for generation of the sequence is shared between a UE and a base station through RRC signaling in advance. Moreover, the IARS may be transmitted from the cell A through random SF (subframe) where the muting RB is present. Alternatively, it may be transmitted periodically.

Simply, previously defined RS can be used as the IARS. For instance, CSI-RS can be used for usage of the IARS as described below. A CSI-RS sequence, a resource configuration, a period configuration scheme and the like can be used for usage of the IARS without any changes.

For instance, the cell A transmits the IARS in the muting RB once every x ms and informs the cell B and the UE B of this IARS configuration. The UE B performs the IARS detection on each RB using the received IARS. If detecting the IARS from specific RB, the UE B is able to know that the corresponding RB is muted. To reduce RS overhead, the use of the IARS may be limited to 2 port CSI-RS.

Figure 14:
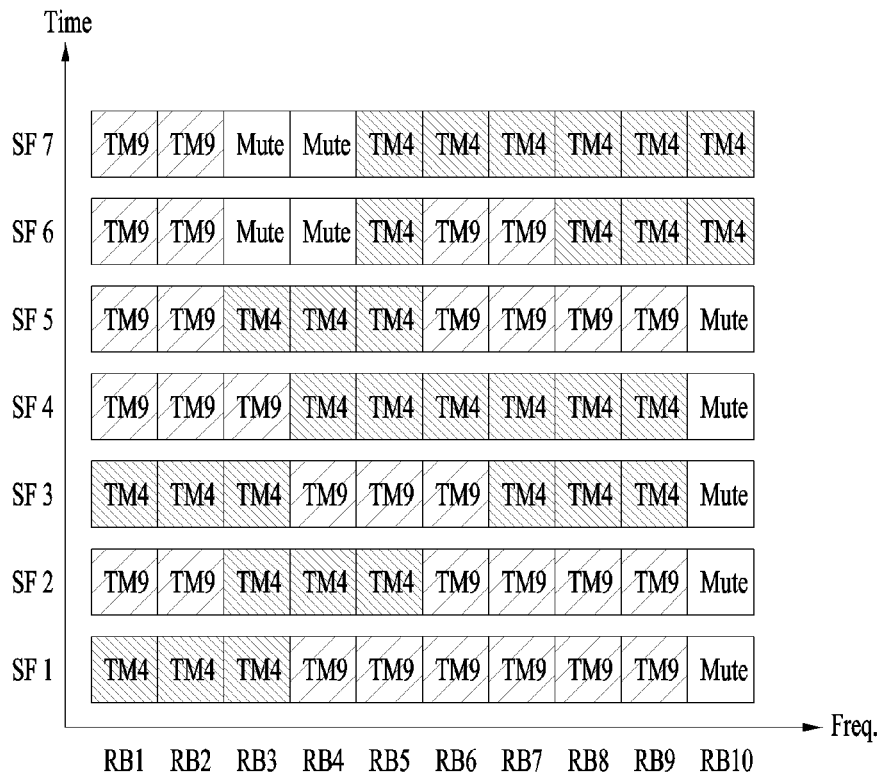
FIG. 14 illustrates an example of use of IARS according to a first embodiment of the present invention.

FIG. 14 illustrates an example of use of IARS when the IARS is defined using CSI-RS. Specifically, FIG. 14 shows scheduling information of the cell A in case of configuring IARS once every 5 ms.

The cell A transmits the IARS in muting RB once every 5 ms starting from SF 1. In SF 1, the cell A transmits the IARS in RB 10 since it performs muting in the RB 10. After performing IARS detection on each of RBs 1, 2, 3, and 10 of the SF 1, the UE B may know that the cell A has performed muting on the RB 10 where the detection is successful. And, the UE B may also know that the cell A has performed CRS based transmission on the RBs 1, 2, and 3 where the detection is failed.

Since an IARS period is assumed to be 5 ms, the UE B assumes that the cell A has performed muting on RB 10 of each of SFs 1, 2, 3, 4, and 5. On the other hand, on remaining RBs of each of the SFs 1, 2, 3, 4 and 5, if the UE B succeeds in detection of DMRS, the UE B assumes that the cell A has performed transmission according to TM 9/10. And, if the UE B fails to detect DMRS, the UE B assumes that the cell A has operated in TM 4 or performed the CRS based transmission.

In SF 6, the UE B detects a location of the muting RB through the IARS detection for the IARS again and then distinguishes DMRS based transmission from CRS based transmission per RB according to the same procedure.

After figuring out RBs where the cell A is in muting, RBs where the cell A performs the CRS based transmission, and RBs where the cell A performs the DMRS based transmission among RBs in which its own data is present, the UE B performs NAICS on RBs in which interference is present based on corresponding TM.

Second Embodiment

The second embodiment of the present invention relates to a method for transmitting an interference presence reference signal (IARS) in CRS based transmission RB of an interfering cell.

According to the second embodiment of the present invention, an interfering cell transmits interference presence RS (IPRS) in CRS based transmission RB but does not transmit separate RS in muting RB. The UE B performs IPRS detection on RBs in which DMRS detection is failed. In RBs in which the IRPS detection is successful, the UE B performs NAICS based on the assumption that the interfering cell has performed CRS based transmission in the corresponding RBs. On the contrary, in RBs in which the IPRS detection is failed, the UE B assumes that the interfering cell has performed muting on the corresponding RBs.

In FIG. 13, for instance, the cell A transmits the IPRS only in RBs 1, 2 and 3. And, the UE B performs the IPRS detection on RBs where the DMRS detection is failed, i.e., RBs 1, 2, 3, and 10. After successfully detecting the IPRS from the RBs 1, 2 and 3 only, the UE B performs NAICS in the RBs 1, 2 and 3 based on the assumption that the cell A has performed the CRS based transmission in the corresponding RBs. On the other hand, the UE B assumes that there is no interference from the cell A in the RB 10 where the IPRS detection is failed.

Since the purpose of the IPRS is not to estimate a channel but to detect whether interference from an adjacent cell is present based on energy detection received through the IPRS, it may have sufficiently low density compared to CRS, CSI-RS, and DMRS, which are used for channel estimation.

An IPRS sequence may be generated from a PN code of which the seed is a cell ID and all information necessary for generation of the sequence is shared between a UE and a base station through RRC signaling in advance. Moreover, the IPRS may be transmitted from the cell A through random SF in which CRS based transmission is performed. Alternatively, it may be transmitted periodically.

Simply, previously defined RS can be used as the IPRS. For instance, CSI-RS can be used for usage of the IPRS as described below. A CSI-RS sequence, a resource configuration, a period configuration scheme and the like can be used for usage of the IPRS without any changes.

For instance, the cell A transmits the IPRS in TM4 RB once every x ms and informs the cell B and the UE B of this IPRS configuration. The UE B performs the IPRS detection on each RB using the received IPRS. If successfully detecting the IPRS from specific RB, the UE B is able to know that the cell A has performed data transmission based on TM 4 in the corresponding RB. To reduce RS overhead, the use of the IPRS may be limited to 2 port CSI-RS.

Figure 15:
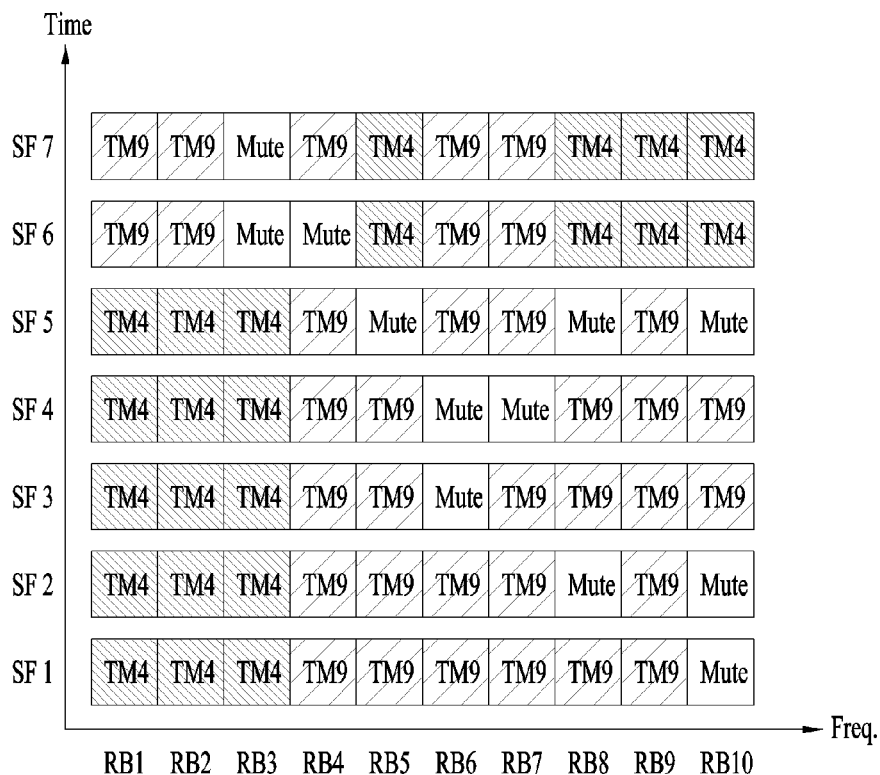
FIG. 15 illustrates an example of use of IPRS according to a second embodiment of the present invention.

FIG. 15 illustrates an example of use of IPRS in case that the IPRS is defined using CSI-RS. Specifically, FIG. 15 shows scheduling information of the cell A in case of configuring CSI-RS for IPRS once every 5 ms.

The cell A transmits IPRS in TM4 RB once every 5 ms starting from SF 1. In SF 1, the cell A transmits the IPRS in RBs 1, 2 and 3 since it performs transmission based on TM 4 in the RBs 1, 2 and 3. After performing IPRS detection on each of RBs 1, 2, 3, and 10 of the SF 1, the UE B may know that the cell A has performed TM 4 based transmission in the RBs 1, 2 and 3 where the detection is successful and that the cell A has performed CRS based transmission in the RB 10 where the detection is failed.

Since an IPRS period is assumed to be 5 ms, the UE B assumes that the cell A has performed the TM 4 based transmission in RBs 1, 2 and 3 of each of SFs 1, 2, 3, 4, and 5. On the other hand, on remaining RBs of each of the SFs 1, 2, 3, 4 and 5, if the UE B succeeds in DMRS detection, the UE B assumes that the cell A has performed transmission according to TM 9/10. On the contrary, if the UE B fails in the DMRS detection, the UE B assumes that the cell A has performed muting.

In SF 6, the UE B detects a location of the TM4 RB through the IPRS detection for the IPRS again and then distinguishes DMRS based transmission from muting per RB according to the same procedure.

After figuring out RBs where the cell A is in muting, RBs where the cell A performs the CRS based transmission, and RBs where the cell A performs the DMRS based transmission among RBs in which its own data is present, the UE B performs NAICS on RBs in which interference is present based on corresponding TM.

In the aforementioned first and second embodiments, the DMRS based transmission and CRS based transmission are described as the TM 9 and TM 4, respectively. However, the TM 9 and TM 4 are merely examples and the technical features of the present invention can be applied to other TMs that use DMRS or CRS.

In the second embodiment, there is an impact on legacy UE operating in CRS based TM. Since the legacy UE A in FIG. 12 cannot detect the existence of IPRS, the legacy UE A performs data decoding on IPRS RE based on the assumption that its data is also present in the IPRS RE. Thus, it may cause a result of increasing BLER of the legacy UE A. In this case, the cell A can minimize the legacy impact by setting the IPRS period to be sufficiently long and transmitting the IPRS periodically. Moreover, in case of TM 4 having the IPRS, the cell A may not perform scheduling for the legacy UE in order to minimize the legacy impact.

Hereinafter, a signal reception method according to one embodiment of the present invention is described with reference to FIG. 16.

In step S161, a UE detects DMRS (demodulation reference signal) from each of a plurality of RBs (resource blocks) included in a reception subframe.

In step S163, the UE detects an interference absence reference signal from RBs where the UE fails to detect the DMRS.

In step S165, the UE receives a signal based on an assumption that among the RBs where the UE fails to detect the DMRS, an RB from which the interference absence reference signal is detected has no interference from an interfering base station and an RB from which the interference absence reference signal is not detected has interference from the interfering base station.

Figure 16:
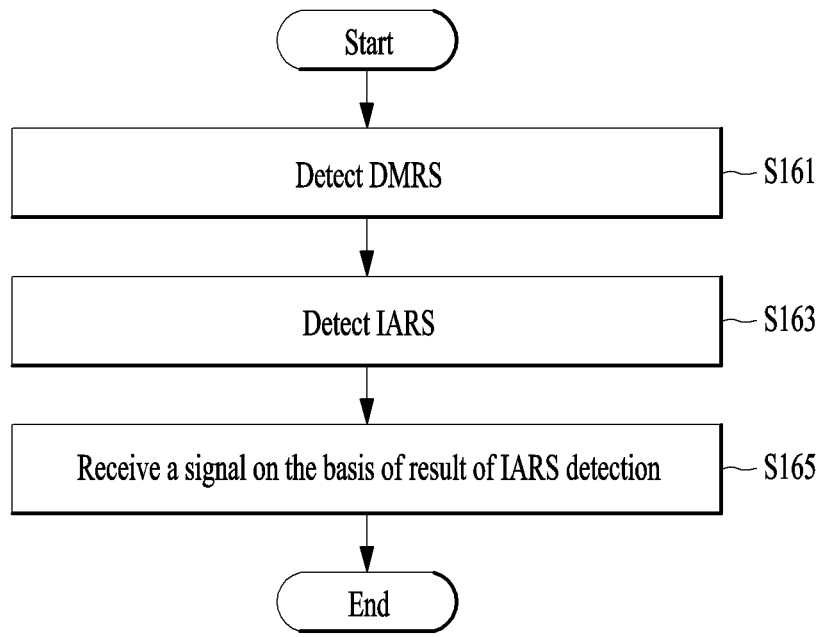
FIG. 16 is a flowchart for describing a signal reception method according to an embodiment of the present invention.

FIG. 16 is a flowchart illustrating the first embodiment according to the present invention and shows the example that the IARS is transmitted in the RB where no interference exist. In addition, it is apparent that the steps illustrated in FIG. 16 can be applied to the second embodiment in which the IPRS is transmitted in the RB where interference exists.

Figure 17:
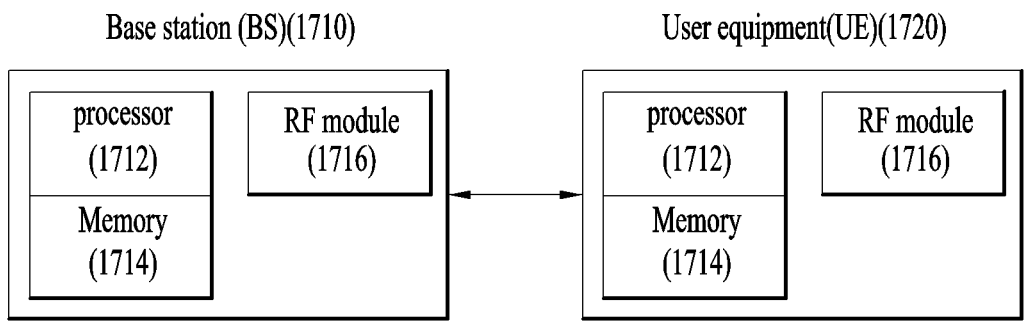
FIG. 17 is a diagram of configurations of a base station and a user equipment applicable to an embodiment of the present invention.

FIG. 17 is a diagram of configurations of a base station and a user equipment applicable to an embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 17, a wireless communication system includes a base station (BS) 1710 and a user equipment (UE) 1720. The base station 1710 includes a processor 1713, a memory 1714 and an RF (radio frequency) unit 1711 and 1712. The processor 1713 can be configured to implement the procedures and/or methods proposed by the present invention. The memory 1714 is connected to the processor 1713 and stores various kinds of informations related to operations of the processor 1713. The RF unit 1716 is connected to the processor 1713 and transmits and/or receives radio or wireless signals. The user equipment 1720 includes a processor 1723, a memory 1724 and an RF unit 1721 and 1422. The processor 1723 can be configured to implement the procedures and/or methods proposed by the present invention. The memory 1724 is connected to the processor 1723 and stores various kinds of informations related to operations of the processor 1723. The RF unit 1721 and 1722 is connected to the processor 1723 and transmits and/or receives radio or wireless signals. The base station 1710 and/or the user equipment 1720 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNode B (eNB), an access point and the like.

Embodiments of the present invention may be implemented using various means. For instance, embodiments of the present invention may be implemented using hardware, firmware, software and/or any combinations thereof In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

Herein, the memory unit may be located inside or outside of the processor and the memory unit may transmit and receive data to and from the processor by using a wide range of methods that have already been disclosed.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

The present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope matching the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The present invention can be applied to wireless communication devices such as a user equipment, a relay node, a base station and the like.

What is claimed is:

1. A method of cancelling interference from a signal and receiving the signal by a user equipment in a wireless communication system, the method performed by the user equipment comprising:
   detecting a demodulation reference signal (DMRS) from each of a plurality of resource blocks (RBs) included in a reception subframe;
   detecting an interference absence reference signal from each of the RBs where the user equipment fails to detect the DMRS; and
   receiving the signal based on an assumption that among the RBs where the user equipment fails to detect the DMRS, an RB from which the interference absence reference signal is detected has no interference from an interfering base station and an RB from which the interference absence reference signal is not detected has interference from the interfering base station,
   wherein a 2-port channel state information reference signal (CSI-RS) is used for the interference absence reference signal.

2. The method of claim 1, wherein the RB from which the interference absence reference signal is detected among the RBs where the user equipment fails to detect the DMRS is assumed to be an RB on which the interfering base station performs muting.

3. The method of claim 1, wherein the RB from which the interference absence reference signal is not detected among the RBs where the user equipment fails to detect the DMRS is assumed to be an RB on which the interfering base station performs common reference signal (CRS) based physical downlink control channel (PDSCH) transmission.

4. The method of claim 1, wherein the interference absence reference signal is transmitted less frequently than a reference signal for channel estimation.

5. The method of claim 1, wherein the interference absence reference signal is generated using a pseudo noise (PN) code based on a cell identifier.

6. The method of claim 1, wherein the interference absence reference signal is transmitted per reference subframe period.

7. A user equipment for cancelling interference from a signal and receiving the signal in a wireless communication system, the user equipment comprising:
   a radio frequency (RF) unit; and a processor, wherein the processor is configured to:
   detect a demodulation reference signal (DMRS) from each of a plurality of resource blocks (RBs) included in a reception subframe,
   detect an interference absence reference signal from each of the RBs where the DMRS detection has failed, and
   control the RF unit to receive the signal based on an assumption that among the RBs where the DMRS detection has failed, an RB from which the interference absence reference signal is detected has no interference from an interfering base station and an RB from which the interference absence reference signal is not detected has interference from the interfering base station, and
   wherein a 2-port channel state information reference signal (CSI-RS) is used for the interference absence reference signal.

8. The user equipment of claim 7, wherein the RB from which the interference absence reference signal is not detected among the RBs where the DMRS detection has failed is assumed to be an RB on which the interfering base station performs common reference signal (CRS) based physical downlink control channel (PDSCH) transmission.

9. The user equipment of claim 7, wherein the RB from which the interference absence reference signal is detected among the RBs where the DMRS detection has failed is assumed to be an RB on which the interfering base station performs muting.

10. The user equipment of claim 7, wherein the interference absence reference signal is transmitted less frequently than a reference signal for channel estimation.

11. The user equipment of claim 7, wherein the interference absence reference signal is generated using a pseudo noise (PN) code based on a cell identifier.

12. The user equipment of claim 7, wherein the interference absence reference signal is transmitted per reference subframe period.

* * * * *